United States Patent
Fujii et al.

(10) Patent No.: US 8,955,908 B2
(45) Date of Patent: Feb. 17, 2015

(54) SEAT LOAD DETECTION DEVICE

(71) Applicant: Aisin Seiki Kabushiki Kaisha, Kariya-shi (JP)

(72) Inventors: Hiroyuki Fujii, Kariya (JP); Takahiro Izuno, Kariya (JP); Isao Honda, Anjo (JP); Yoshiaki Tomatsu, Kariya (JP); Yusuke Takahashi, Toyota (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 54 days.

(21) Appl. No.: 13/841,324

(22) Filed: Mar. 15, 2013

(65) Prior Publication Data

US 2014/0265475 A1 Sep. 18, 2014

(51) Int. Cl.
*B60N 2/44* (2006.01)
*B60N 2/00* (2006.01)

(52) U.S. Cl.
CPC . *B60N 2/44* (2013.01); *B60N 2/002* (2013.01)
USPC .................................. 297/217.2; 297/217.3

(58) Field of Classification Search
CPC ....................................................... B60N 2/002
USPC .......................................... 297/217.2, 217.3
See application file for complete search history.

(56) References Cited

U.S. PATENT DOCUMENTS

| 5,439,249 | A | * | 8/1995 | Steffens et al. ............ 280/735 X |
| 8,328,276 | B2 | | 12/2012 | Inayoshi et al. |
| 8,448,529 | B2 | * | 5/2013 | Aoyama et al. .......... 73/862.381 |
| 2011/0005843 | A1 | | 1/2011 | Ito et al. |

FOREIGN PATENT DOCUMENTS

| DE | 4442841 A1 * | 6/1995 | ............. B60N 2/002 |
| JP | 2011-17592 | 1/2011 | |
| JP | 2011-43454 | 3/2011 | |

* cited by examiner

*Primary Examiner* — Anthony D Barfield
(74) *Attorney, Agent, or Firm* — Oblon, Spivak, McClelland, Maier & Neustadt, L.L.P.

(57) ABSTRACT

A seat load detection apparatus includes: a load detector detecting part of a load acting on a vehicle seat which is capable of changing the posture of a seatback forward from the first stage position as a most upright position of a seatable position to the forwardly inclined position which is a forwardly inclined position on which the passenger cannot be seated; a load body determination unit determining a load body acting on the vehicle seat on the basis of a detected load detected by the load detector; a seat posture detector detecting the forwardly inclined position of the seatback; and a state determination unit determining the state change of the vehicle seat on the basis of the variation of the detected load and restrict the determination of the state change of the vehicle seat on the basis of an output from the seat posture detector.

7 Claims, 12 Drawing Sheets

FRONT COLLISION AT THE TIME OF FORWARD TRAVELING

⬇ LOAD IN DIRECTION OF COMPRESSION
⬆ LOAD IN TENSILE DIRECTION

REAR COLLISION AT THE TIME OF REARWARD TRAVELING

⬇ LOAD IN DIRECTION OF COMPRESSION
⬆ LOAD IN TENSILE DIRECTION

SEAT LOAD DETECTION DEVICE

TECHNICAL FIELD

This disclosure relates to a seat load detection apparatus.

BACKGROUND ART

In order to deploy an airbag at the time of collision of a vehicle, a load sensor is provided between a seat cushion of a vehicle seat and a vehicle floor, a load body acting on the vehicle seat is determined on the basis of the load detected by the load sensor and, for example, when it is determined that an adult is seated on a vehicle seat for a passenger seat, the airbag is brought into a deployment-allowed state, and when it is determined that there is no passenger on the vehicle seat or when it is determined that a child is seated, the airbag is brought into a deployment-disabled state.

For example, when the vehicle engages in a light collision, a load not smaller than a predetermined value acts on the vehicle seat due to an impact generated in the vehicle, and hence a seat frame of the seat cushion may be subjected to a slight deformation. When the deformed portion of the seat frame is a portion where the load sensor is mounted, there arises a problem of occurrence of a displacement of a zero point position (a position where the detected load is zero when no load is applied) of a detection system of the load sensor followed by lowering of a detecting accuracy of the load in the vehicle seat. Generally, when the collision of the vehicle is light, a user does not bring the vehicle to a service garage and hence there is no opportunity to inspect or repair the vehicle. In such a case, a state of the vehicle seat in which the determination of the load body is not accurate due to the lowering of the detection accuracy of the load is left untouched.

In order to solve such a problem, an example of the seat load detection apparatus which is capable of notifying the passenger of necessity of inspection of the vehicle by allowing detection of a case where the vehicle engages in a light collision on the basis of a variation in detection load from the load sensor is described in JP 2011-43454 A.

In contrast, since the value of the load detected by an inclination angle of the vehicle varies, the determination accuracy of the load body is liable to be lowered and, for example, the load sensor disposed on the rear side of the seat shares a smaller rate of the load body on the seat on a downhill than the flatland, underdetection of the load may occur. Therefore, even though a passenger of the seat is an adult, the passenger may be determined as a child. In order to solve such a problem, an example of a seat load detection apparatus configured in such a manner that whether the vehicle is on a flat road or on the hill is detected on the basis of the detected load from the load sensor and, if it is determined to be on the hill, the detected load is corrected in accordance with the fore-and-aft inclination angle of the vehicle is disclosed in JP 2011-17592 A.

However, for example, determining the load body simply on the basis of a load applied on a rear portion of the seat cushion is often associated with a problem. When a posture changing apparatus configured to change the position of the seatback which corresponds to a backrest for a passenger from a first stage position which is a most upright position of a seatable position to a forwardly inclined position which is a position inclined forward, that is, a non-seatable position is mounted on the vehicle seat on the side of passenger seat in order to facilitate getting on the vehicle to a rear seat or getting out of the vehicle from the rear seat, there arises a new problem as described below. The first stage position of the seatback is set as the zero point position (where the detected load is set to be zero when no load is applied), and is generally adjusted in such a manner that the detected load becomes zero when no load is applied.

When the seatback is restored from the forwardly inclined position to the first stage position, an impact is generated when the seatback is restored to the first stage position. Therefore, the detected load is as much as that in the case where the vehicle engages in a light collision when the vehicle is traveling rearward, and hence an erroneous operation that a vehicle collision, which is not actually occurred is detected occurs even though the vehicle seat is not changed into a state in which an impact is applied to the vehicle.

In contrast, when the vehicle is on the flat road and the seatback is at the forwardly inclined position, the center of gravity of the seatback is moved forward of the seat cushion, and hence the load sensor disposed on the rear side of the seat detects a load smaller than that in the case where the seatback is at the first stage position. Consequently, an erroneous operation that the vehicle is detected to be on a downhill even though the vehicle seat is not changed to a state that requires to correct the detected load according to the inclination angle of the hill, that is, even though the vehicle is on the flat road, and the detected seating load is corrected according to the inclination angle in the fore-and-aft direction of the vehicle on the downhill occurs.

Therefore, a seat load detection apparatus configured so as not to be associated with drawbacks as described above is desired.

SUMMARY

A seat load detection apparatus disclosed herein includes: a load detector configured to detect part of a load acting on a vehicle seat which is capable of changing the posture of a seatback from a first stage position as a most upright position of a seatable position to a forwardly inclined position which is a forwardly inclined position on which the passenger cannot be seated; a load body determination unit configured to determine a load body acting on the vehicle seat on the basis of a detected load detected by the load detector; a seat posture detector configured to detect the forwardly inclined position of the seatback; and a state determination unit configured to determine the state change of the vehicle seat on the basis of the variation of the detected load and restrict the determination of the state change of the vehicle seat on the basis of an output from the seat posture detector. Restricting the determination of the state change of the vehicle seat includes restricting the determination itself and executing the determination itself but not reflecting the result of determination thereof.

DETAILED DESCRIPTION

Figure 1:
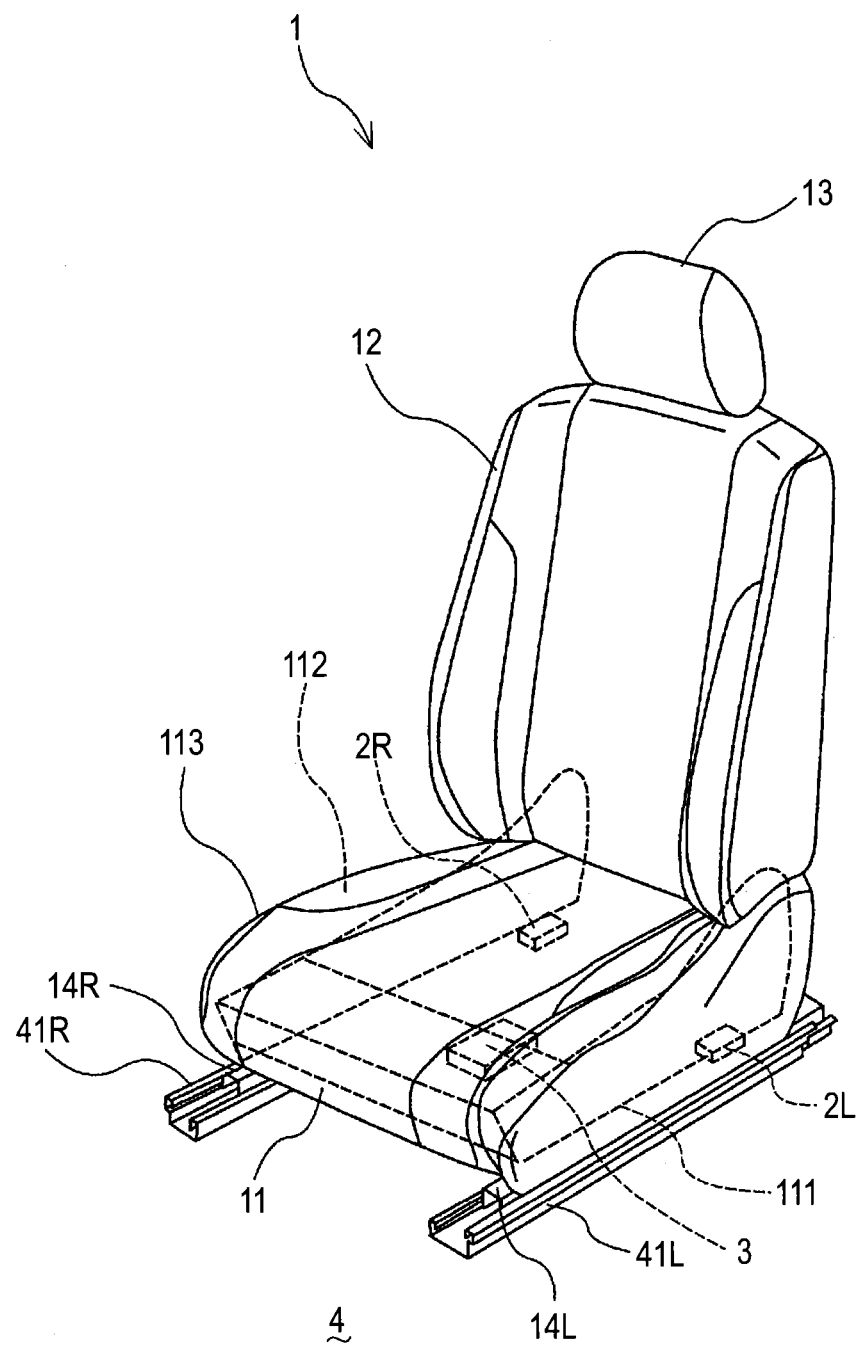
FIG. 1 is a perspective view of a vehicle seat provided with a seat load detection apparatus illustrating an embodiment of disclosed here.

Referring now to the drawings, an embodiment disclosed here will be described below. In the description, the front of a passenger seated on a vehicle seat 1 is defined as the front of the vehicle seat 1, and the right side of the passenger is defined as the right side of the vehicle seat 1, and the left side of the passenger is defined as the left side of the vehicle seat 1.

As illustrated in FIG. 1, the vehicle seat 1 for the passenger seat mounted on a vehicle having a steering wheel on the left side includes a seat cushion 11 where the passenger is to be seated, and a seatback 12 as a backrest for the passenger mounted so as to be rotatable in the fore-and-aft direction at a rear end portion of the seat cushion 11. A headrest 13 configured to support the head of the passenger is mounted at an upper end of the seatback 12.

The seat cushion 11 includes a seat frame 111, a pad member 112 arranged above the seat frame 111, and a skin 113 covering the surface of the pad member 112. A pair of left and right upper rails 14R and 14L are mounted on a lower surface of the seat frame 111. The upper rails 14R and 14L engage a pair of lower rails 41R and 41L fixed on a vehicle floor 4 of the vehicle so as to be movable in the fore-and-aft direction. Accordingly, the vehicle seat 1 moves in the fore-and-aft direction on the vehicle floor 4, and is configured to be fixable at a position where the passenger desires.

Figure 2:
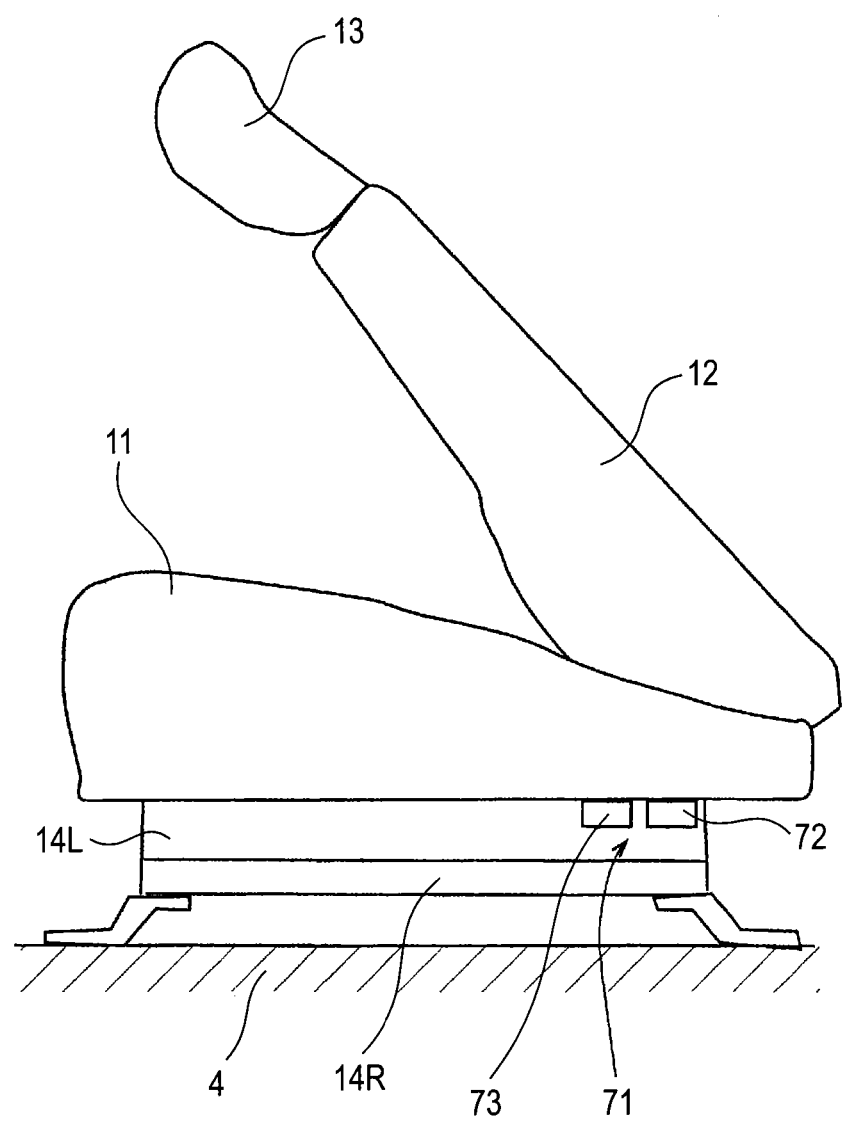
FIG. 2 is an explanatory drawing illustrating a forwardly inclined position of a seatback of the vehicle seat illustrated in FIG. 1.

The seatback 12 of the vehicle seat 1 as a backrest for the passenger is capable of changing a posture thereof from a first stage position which is a most upright position of a seatable position as illustrated in FIG. 1 to a forwardly inclined position which is a position inclined forward, that is, a non-seatable position as illustrated in FIG. 2, for example, to a position where the seatback 12 is folded so as to come into contact with the seat cushion 11 in order to facilitate getting on the vehicle to a rear seat or getting out of the vehicle from the rear seat, and the seatback 12 may be restored from the forwardly inclined position to the first stage position.

A seat posture detector 71 configured to detect the posture of the seatback 12 is provided on the vehicle seat 1. The seat posture detector 71 includes a standard position switch 72 configured to perform a switching operation (for example, a turning-ON operation) when the seatback 12 is at the standard position. The seat posture detector 71 also includes a forwardly inclined position switch 73 configured to perform the switching operation (for example, a turning-ON operation) when the seatback 12 is at the forwardly inclined position. The standard position refers to a standard seating position of a passenger having an average physical structure.

A pair of left and right seating sensors 2R and 2L are interposed between the seat frame 111 and the upper rails 14R and 14L respectively as illustrated in FIG. 1. The both seating sensors 2R and 2L are mounted at a rear edge portion of the seat cushion 11 of the vehicle seat 1. The seating sensors 2R and 2L are both configured to detect a load applied to the seat cushion 11 when the passenger is seated on the vehicle seat 1 or an article is placed thereon by the load sensor formed of a strain gauge or the like. The seating sensors 2R and 2L detect the load with respect to the seat cushion 11 for an airbag deployment control or an operation control of a pretension apparatus for the seatbelt, although not limited thereto. In the embodiment, the type, the mode, and the detection principle of the seating sensors 2R and 2L are not specifically limited.

The right seating sensor 2R is interposed between the right portion of the seat frame 111 and the right upper rail 14R, and is configured to detect a load shared by the right portion of the seat cushion 11. In the same manner, the left seating sensor 2R is interposed between the left portion of the seat frame 111 and the left upper rail 14L, and is configured to detect a load shared by the left portion of the seat cushion 11. The right seating sensor 2R and the left seating sensor 2L are provided a predetermined distance apart from each other in the direction of the width of the seat cushion 11. Hereinafter, when referring to the right seating sensor 2R and the left seating sensor 2L collectively, the term "seating sensors 2R and 2L" is used.

Figure 3:
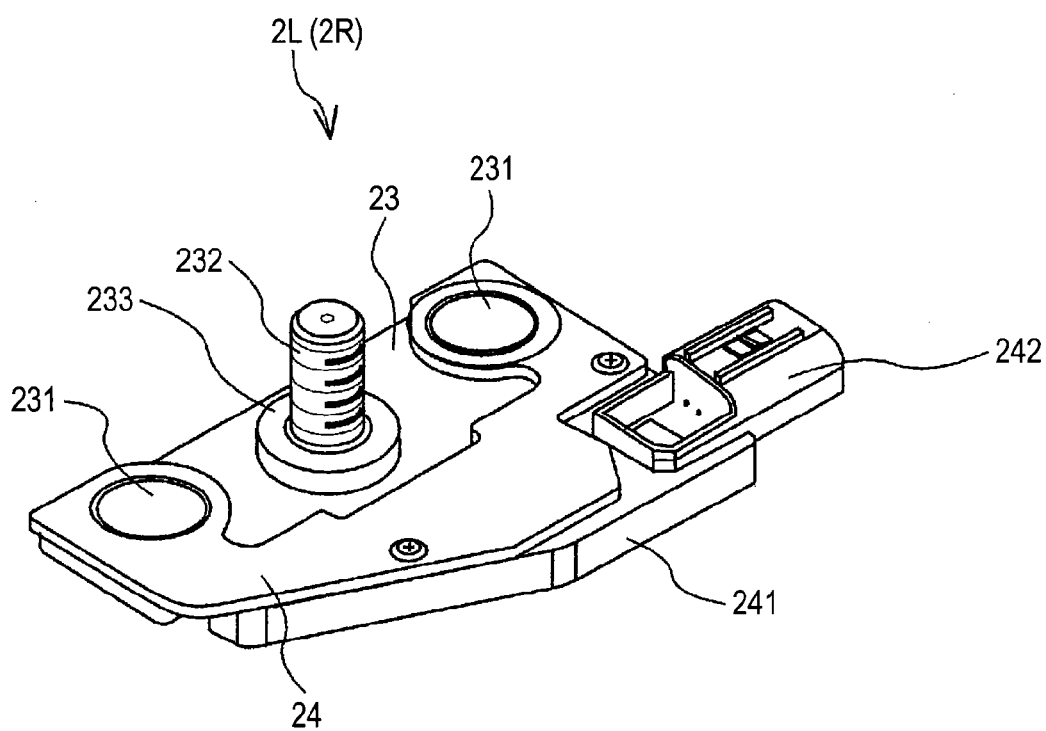
FIG. 3 is an enlarged view of a seating sensor illustrated in FIG. 1.

As illustrated in FIG. 3, the seating sensors 2R and 2L (only the left seating sensor 2L is illustrated in FIG. 3) include a flexure element 23 formed of a metallic plate, a bracket 24 holding the flexure element 23, and a amplifier case 241 formed on a lower surface of the bracket 24. A strain gauge (not illustrated) is adhered to a lower surface of the flexure element 23. An amplification unit (not illustrated) is integrated in the interior of the amplifier case 241, and a connector 242 for bringing the left seating sensor 2L into contact with a controller 3 (which corresponds to a control unit of the seat load detection apparatus 10 described in Claims) is integrally formed at a front end of the amplifier case 241.

A bush 231 is attached into each of mouthing holes provided at a front end portion and a rear end portion of the flexure element 23. A mounting bolt (not illustrated) provided upright on the upper rail 14L is inserted into each of the bush 231 from below, and a fastening nut is screwed and fastened from above the bracket 24, whereby the flexure element 23 is mounted on the upper rail 14L. In a state in which the flexure element 23 is mounted on the upper rail 14L, a sufficient clearance is formed between the flexure element 23 and the upper rail 14L by the thickness of the bush 231 located below the flexure element 23.

A stud bolt 232 is attached to a center portion of the flexure element 23. A spacer 233 is mounted on the stud bolt 232 so as to be positioned on an upper surface of the flexure element 23. The stud bolt 232 is inserted into a mounting hole (not illustrated) formed on a lower surface of the seat frame 111, then the nut member is fastened from above, whereby the flexure element 23 is mounted below the seat frame 111. In a state in which the flexure element 23 is mounted on the seat frame 111, a sufficient clearance is formed also between the flexure element 23 and the seat frame 111 by the thickness of the spacer 233.

In the configuration described above, the flexure element 23 is formed so as to be deflectable in the vertical direction by a change of the relative position between the seat frame 111 and the upper rails 14R and 14L. The strain gauges of the seating sensors 2R and 2L are each configured to detect a load applied to the seat cushion 11 by the flexure element 23 brought into a compressed state in which a center portion (a portion where the stud bolt 232 is mounted) is pressed downward, or by the flexure element 23 brought into the tensed state in which the center portion thereof is pulled upward. In contrast, in a case where the strain gauge is adhered on the upper surface of the flexure element 23, it is apparent that the strain gauge is configured to detect a load applied to the seat cushion 11 by the flexure element 23 brought into a compressed state in which the center portion (a portion where the stud bolt 232 is mounted) is pressed upward, or by the flexure element 23 brought into a tensed state in which the center portion thereof is pulled downward. The right seating sensor 2R has a symmetrical shape with respect to the left seating sensor 2L illustrated in FIG. 3.

The seating sensors 2R and 2L are each composed of a publicly known Wheatstone bridge circuit including one to four strain gauges, and are configured to output a bridge voltage, which is a voltage between center points of the Wheatstone bridge circuits.

The above-described controller 3 is connected to the seating sensors 2R and 2L. The controller 3 includes a load detector 31 configured to detect part of a load acting on the vehicle seat 1 as a detected load W on the basis of the outputs from the seating sensors 2R and 2L. Although the load detector 31 is configured to compute the sum of the outputs of the seating sensors 2R and 2L to obtain the detected load W in this example, the invention is not limited thereto.

The load detector 31 of the controller 3 detects whether the flexure elements 23 of the seating sensors 2R and 2L are in the compressed state or in the tensed state by the bridge voltage value described above. In this case, whether the flexure elements 23 are in the compressed state or in the tensed state may be distinguished on the basis whether the bridge voltage is positive or negative (the direction of the voltage). Alternatively, it is also possible to define the positive predetermined value of the bridge voltage as a reference voltage to determine the compressed state when a voltage value not smaller than the reference voltage is detected and determine the tensed state when the voltage value smaller than the reference voltage is detected.

Figure 4:
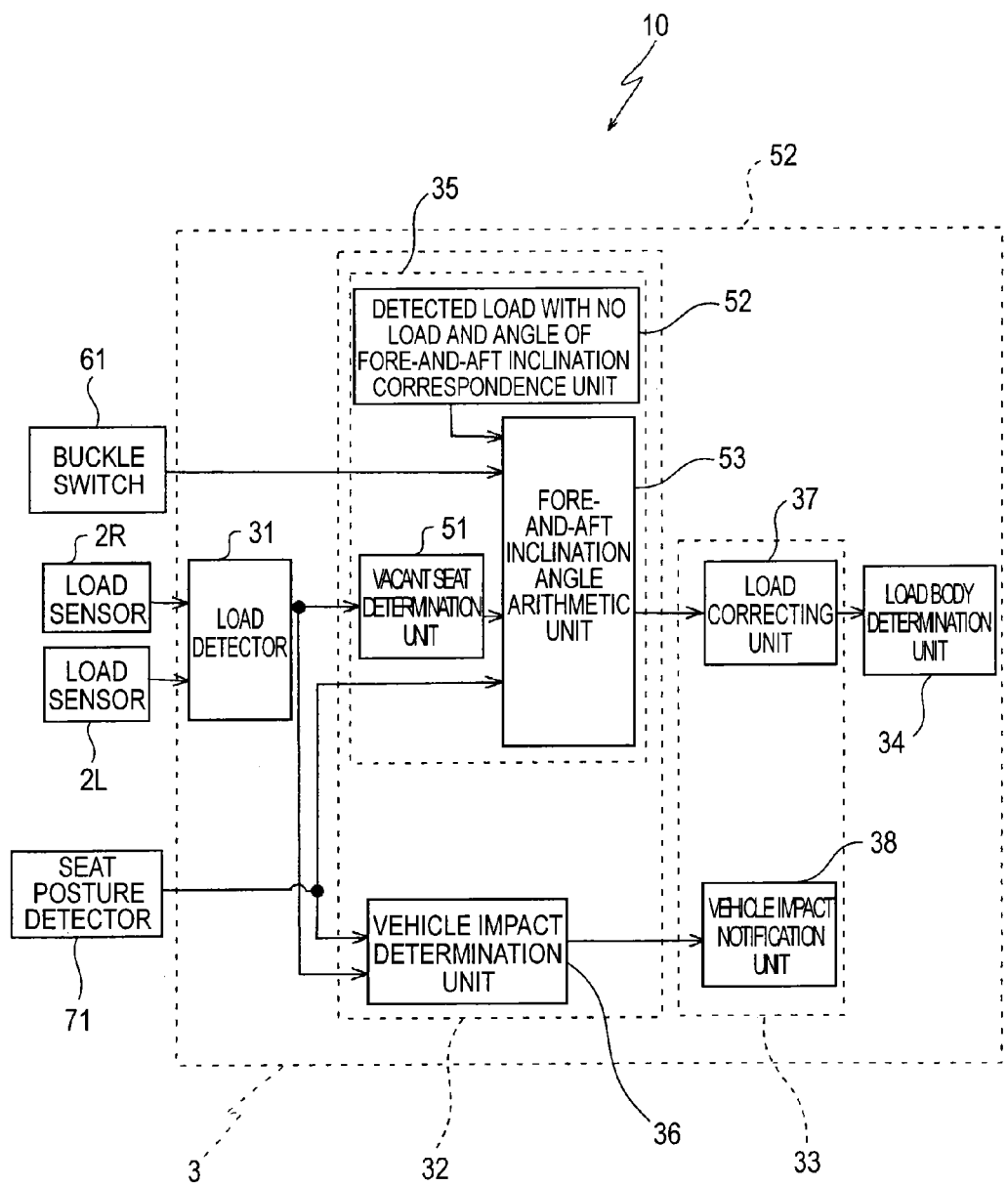
FIG. 4 is a block diagram illustrating the entire seat load detection apparatus.

Subsequently, FIG. 4 illustrates a configuration of the seat load detection apparatus 10 of the embodiment disclosed here, and the controller 3 includes the load detector 31 described above, a state determination unit 32 configured to determine a state change of the vehicle seat 1 on the basis of the variation of the detected load W detected by the load detector 31 and, at the same time, restrict the determination of the state change of the vehicle seat 1 on the basis of an output from the seat posture detector 71, an operating portion 33 configured to operate in accordance with the result of determination of the state determination unit 32, and a load body determination unit 34 configured to determine the load body acting on the vehicle seat 1 on the basis of the detected load W detected by the load detector 31.

On the basis of the variation of the detected load W, the state determination unit 32 includes a hill determination unit 35 configured to determine whether or not the vehicle is on the hill and also determine whether or not the vehicle seat 1 is changed to a state in which correction of the detected load W is needed according to the inclination angle of the hill, and a vehicle impact determination unit 36 configured to determine whether or not the vehicle seat 1 is changed to a state in which an impact is applied to the vehicle on the basis of the variation of the detected load W. The operating portion 33 includes a load correcting unit 37 configured to correct the detected load W according to the inclination angle of the hill, and a vehicle impact notification unit 38 configured to notify the fact that the vehicle has received the impact to the passenger.

The hill determination unit 35 include a vacant seat determination unit 51, a detected load with no load and angle of fore-and-aft inclination correspondence unit 52, and a fore-and-aft inclination angle arithmetic unit 53. The load detector 31, the vacant seat determination unit 51 of the hill determination unit 35 in the state determination unit 32, the detected load with no load and angle of fore-and-aft inclination correspondence unit 52, the fore-and-aft inclination angle arithmetic unit 53, the vehicle impact determination unit 36, the load correcting unit 37 of the operating portion 33, and the load body determination unit 34 are realized mainly by software.

Information on the posture such as the standard position and the forwardly inclined position of the seatback 12 is also taken into the controller 3 as an output of the seat posture detector 71. Whether or not the seatback 12 is at the standard position may be determined by the output from the standard position switch 72. Whether or not the seatback 12 is at the forwardly inclined position may be determined by the output from the forwardly inclined position switch 73.

Whether or not a predetermined time TX set in advance has elapsed after disengagement of the seatback 12 from the forwardly inclined position may be determined only by counting an elapsed time with the start of the counting of the predetermined time TX set at a time point when the forwardly inclined position switch 73 is turned OFF and comparing the measured time with the predetermined time TX. The predetermined time TX is normally a time corresponding to a period from a time point when the seatback 12 leaves the forwardly inclined position until a time when a load associated with an impact is occurring when being restored to the first stage position and, preferably, a quantity of allowance is added in order to increase the detection accuracy. The predetermined time TX corresponds to a restricted time described in Claims.

A buckle for fastening the seatbelt provided on the vehicle seat 1 is provided with a buckle switch 61 configured to detect an insertion-and-ejection state, and a buckle information BSW output therefrom is taken into the controller 3. A signal of the seat posture detector 71 configured to detect the forwardly inclined position of the seatback 12 and an action thereof associated with the forwardly inclined position is also taken into the controller 3 and acts on the state determination unit 32.

Here, a zero point calibration of the detected load W in the load detector 31 is performed in advance. At the time of the zero point calibration, a part of the own weight of the vehicle seat 1 is applied to the both seating sensors 2R and 2L in the reference state of the seatback 12 in which the seatback 12 is at the standard position where the standard position switch 72 is ON, the vehicle is not inclined, and no load body is placed on the vehicle seat 1. Then, the level is adjusted so that the output of the load detector 31 at this time becomes zero. By performing the zero point calibration, the detected load W becomes a load corresponding only to the load body excluding the own weight of the seat. It is also possible to omit the standard position switch 72 and perform the zero point calibration at an operation switching position of the forwardly inclined position switch 73. Specifically, a value which makes the output from the load detector 31 to be zero at the standard position is set in the forwardly inclined position. It is also possible to change the forwardly inclined position switch 73 to a first stage position switch which performs a switching action at the first stage position (the most upright position of the seatable position) and perform the zero point calibration in the same manner as described above.

Subsequently, on the basis of FIG. 5 and FIG. 6, a load generated on the seat cushion 11 of the vehicle seat 1 when an impact is applied to the vehicle by a collision as a vehicle state will be described. From various experiments and experiences, the inventor found that the following phenomenon occurs about the load on the seat cushion 11 at the time of the vehicle collision.

Figure 5:
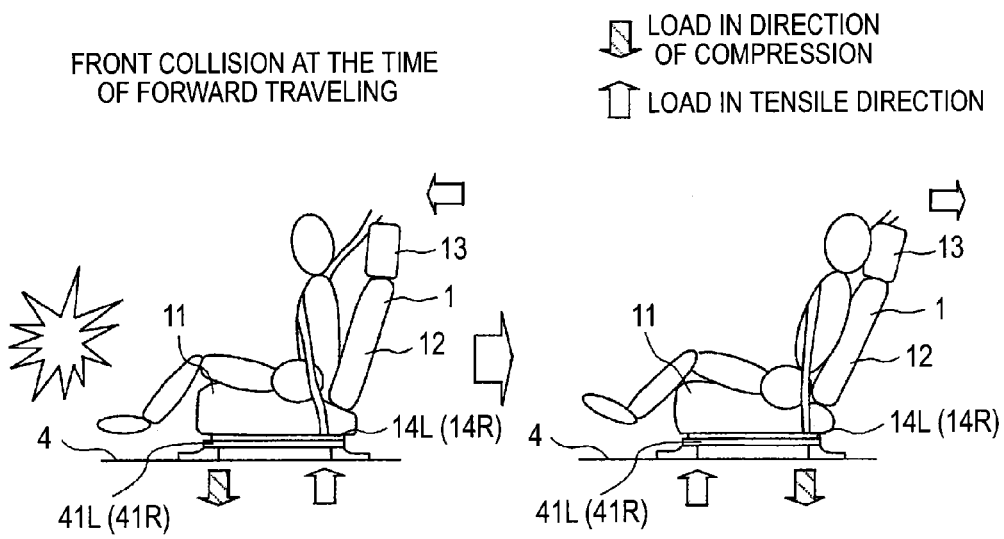
FIG. 5 is a simplified drawing for explaining a load applied to the vehicle seat at the time of a front collision of the vehicle.

As illustrated on the left illustration in FIG. 5, when a collision is generated in the front of the vehicle when the vehicle travels forward, a forward acceleration is generated with respect to the vehicle seat 1 including the seated person at the moment of the collision. Accordingly, in the vehicle seat 1, a counterclockwise moment in FIG. 5 occurs. Therefore, a load not smaller than the predetermined value applied in the direction toward the vehicle floor 4 of the vehicle (hereinafter, the load applied in the direction toward the vehicle floor 4 is referred to as a load in the direction of compression) is generated at a lower front edge of the seat cushion 11, while a load not smaller than the predetermined value applied in the direction away from the vehicle floor 4 of the vehicle (hereinafter, the load applied in the direction away from the vehicle floor 4 is referred to as a load in the tensile direction) is generated at a lower rear edge of the seat cushion 11.

Figure 7:
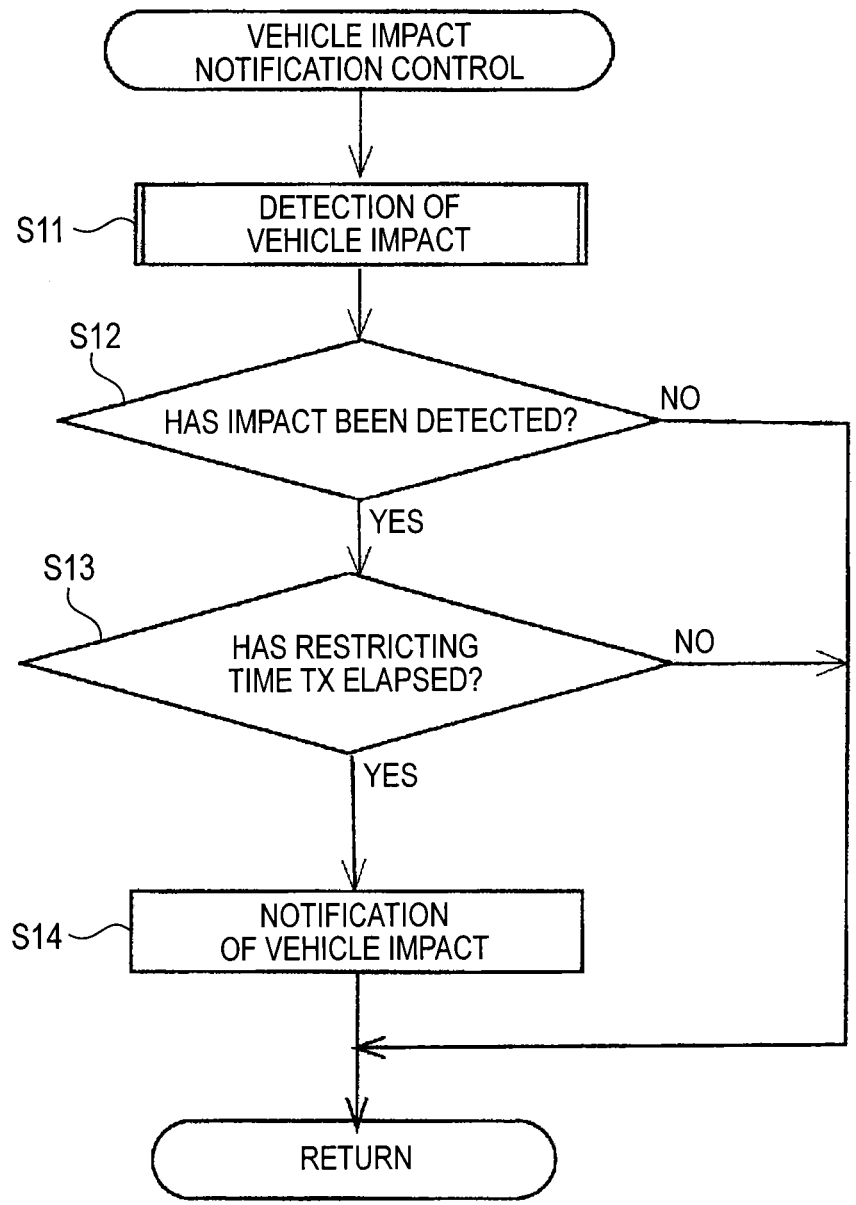
FIG. 7 is a flowchart diagram schematically illustrating an example of vehicle impact notification control of the seat load detection apparatus.

Then, within a very short predetermined time from the occurrence of the collision in the front of the vehicle, and a rearward return is generated with respect to the vehicle seat 1 as in the right drawing in FIG. 7, whereby a clockwise moment in FIG. 7 is generated in the vehicle seat 1. Therefore, a load in the tensile direction not smaller than the predetermined value is generated at a lower front edge of the seat cushion 11, while a load in the direction of compression not smaller than the predetermined value applied is generated at a lower rear edge of the seat cushion 11.

Figure 6:
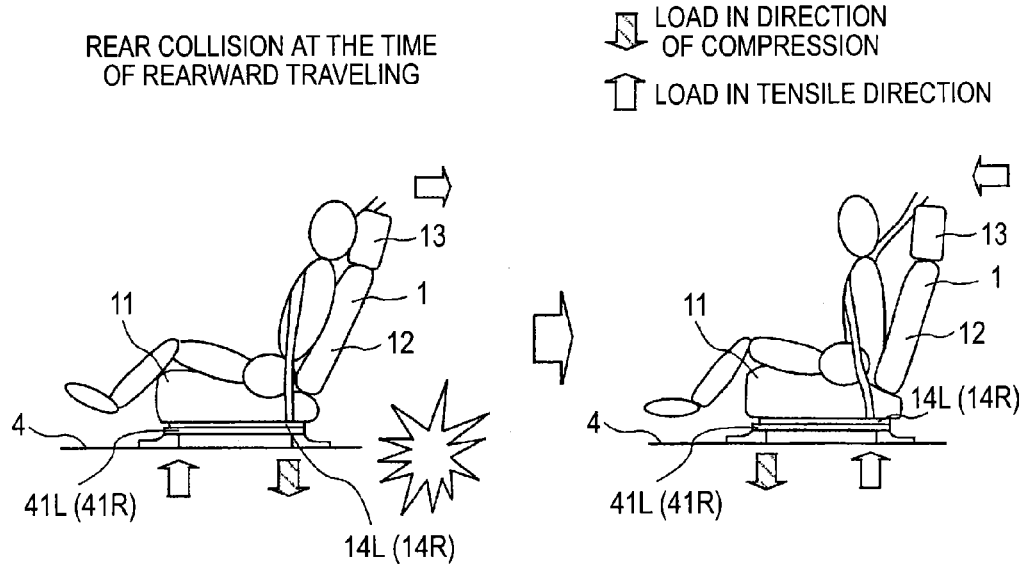
FIG. 6 is a simplified drawing for explaining a load applied to the vehicle seat at the time of a rear collision of the vehicle.

As illustrated in FIG. 6, when a collision is generated at the rear of the vehicle when the vehicle travels rearward, the front and rear positions where the respective loads are generated with respect to the above-described front collision become vice versa. As illustrated in the left drawing in FIG. 6, when a collision is generated at the rear of the vehicle when the vehicle travels rearward, a rearward acceleration is generated with respect to the vehicle seat 1 including the seated person at the moment of the collision, whereby a clockwise moment in FIG. 6 is generated in the vehicle seat 1. Therefore, a load in the direction of compression not smaller than the predetermined value is generated at a lower rear edge of the seat cushion 11, while a load in the tensile direction not smaller than the predetermined value applied is generated at a lower front edge of the seat cushion 11.

Then, within a very short predetermined time from the occurrence of the collision in the rear of the vehicle, and a forward return is generated with respect to the vehicle seat 1 as in the right drawing in FIG. 6, whereby a counterclockwise moment in FIG. 6 is generated in the vehicle seat 1. Therefore, a load in the tensile direction not smaller than the predetermined value is generated at a lower rear edge of the seat cushion 11, while a load in the direction of compression not smaller than the predetermined value applied is generated at a lower front edge of the seat cushion 11.

Needless to say, the state in which the load in the direction of compression described above is generated corresponds to the compressed sate of the flexure elements 23 of the seating sensors 2R and 2L, and the state in which the load in the tensile direction is generated corresponds to the tensed state of the flexure elements 23 of the seating sensors 2R and 2L. As described above, although a detailed mechanism of the cause of occurrence of return of the vehicle seat 1 in a short time after the collision irrespective of whether it is the front collision or the rear collision is not known, it is considered to be caused by a rigidity of the seat frame 111, the vehicle floor 4, and the like.

When the seatback 12 is restored from the forwardly inclined position illustrated in FIG. 2 to the first stage position illustrated in FIG. 1, a load same as the case where the collision is generated on the rear of the vehicle (illustrated in FIG. 6) is generated while the vehicle described above is moved rearward. In other words, at a moment when the seatback 12 is restored from the forwardly inclined position to the first stage position, a rearward acceleration is generated with respect to the vehicle seat 1, whereby a clockwise moment in FIG. 6 is generated in the vehicle seat 1. Therefore, a load in the direction of compression not smaller than the predetermined value is generated at a lower rear edge of the seat cushion 11, while a load in the tensile direction not smaller than the predetermined value applied is generated at a lower front edge of the seat cushion 11. Then, within a very short predetermined time from the restoration of the seatback 12 to the first stage position, a forward return is generated with respect to the vehicle seat 1 as in the right drawing in FIG. 6, whereby a counterclockwise moment in FIG. 6 is generated in the vehicle seat 1. Therefore, a load in the tensile direction not smaller than the predetermined value is generated at a lower rear edge of the seat cushion 11, while a load in the direction of compression not smaller than the predetermined value applied is generated at a lower front edge of the seat cushion 11.

The loads generated on the vehicle seat 1 when the forward collision and the rearward collision of the vehicle occur, and when the seatback 12 is restored from the forwardly inclined position to the first stage position have been described above. However, the loads are generated in the same manner as the case described above on the vehicle seat 1 even at the time of a collision from other directions. In other words, when the collision from the side or from the oblique direction of the vehicle, a load in the direction of compression not smaller than the predetermined value is generated at a peripheral edge portion of the seat cushion 11 located on the side near the side of the collision at a moment of the collision, and a load in the tensile direction not smaller than the predetermined value applied is generated at a peripheral edge portion of the seat cushion 11 located at a position apart from the side of the collision. Subsequently, a return is generated with respect to the vehicle seat 1 within a very short predetermined time from the occurrence of the collision.

Subsequently, on the basis of FIG. 7, an example of a vehicle collision notification control of the vehicle seat 1 by the controller 3 in the embodiment disclosed here will be described. First of all, vehicle impact detection is performed in Step S11. Subsequently, whether or not there is the vehicle impact detection is determined in Step S12. If the fact that the impact is applied to the vehicle is not detected in Step S12, a control flow is terminated without performing the vehicle impact notification.

In contrast, when the fact that an impact is applied to the vehicle is detected in Step S12, the procedure goes to Step S13, and whether or not application of the impact to the vehicle has occurred after a predetermined time, which is the restricting time TX set in advance for restricting the determination of the state change of the vehicle seat 1, has elapsed from a moment when the seatback 12 has left the forwardly inclined position is determined. When the application of the impact to the vehicle has occurred after a lapse of the restricting time TX, it is determined that the vehicle seat 1 is changed to a state in which the impact is applied to the vehicle and the procedure goes to Step S14, where the vehicle impact notification is performed and the vehicle impact notification unit 38 as the operating portion 33 is activated. The vehicle impact notification unit 33, such as an in-vehicle speaker or a notification light-emitting member, notifies the fact that the inspection of the vehicle is needed because the impact is applied to the vehicle to the passenger.

When it is determined that the application of the impact on the vehicle is before the elapse of the restricting time TX in Step S13, the operation of the vehicle impact notification unit 33 for determining whether or not the vehicle seat has changed to the state in which the impact is applied to the vehicle is restricted, that is, the detection of the fact that the impact is applied to the vehicle is not reflected, and the control flow is terminated without performing the vehicle collision notification. Therefore, when the seatback 12 is restored from the forwardly inclined position to the first stage position, an impact is generated when the seatback 12 is restored to the first stage position. Therefore, the same detected load W as the case where the vehicle seat 1 is changed to the state in which an impact is applied to the vehicle because the vehicle engages in the light collision at the rear of the vehicle when the vehicle moves rearward is obtained. In such a case, it is determined that the vehicle seat 1 is not changed to the state in which an impact is applied to the vehicle in the determination in Step S13, and variation of the detected load W on the basis of the posture change of the seatback 12 is prevented from being erroneously recognized as the state change on the basis of other causes. More specifically, variation of the detected load W on the basis of the posture change which causes the seatback 12 to restore from the forwardly inclined position to the first stage position is prevented from being erroneously recognized as the state change of the vehicle seat 1 caused by the a light collision and an impact applied to the vehicle.

Figure 8:
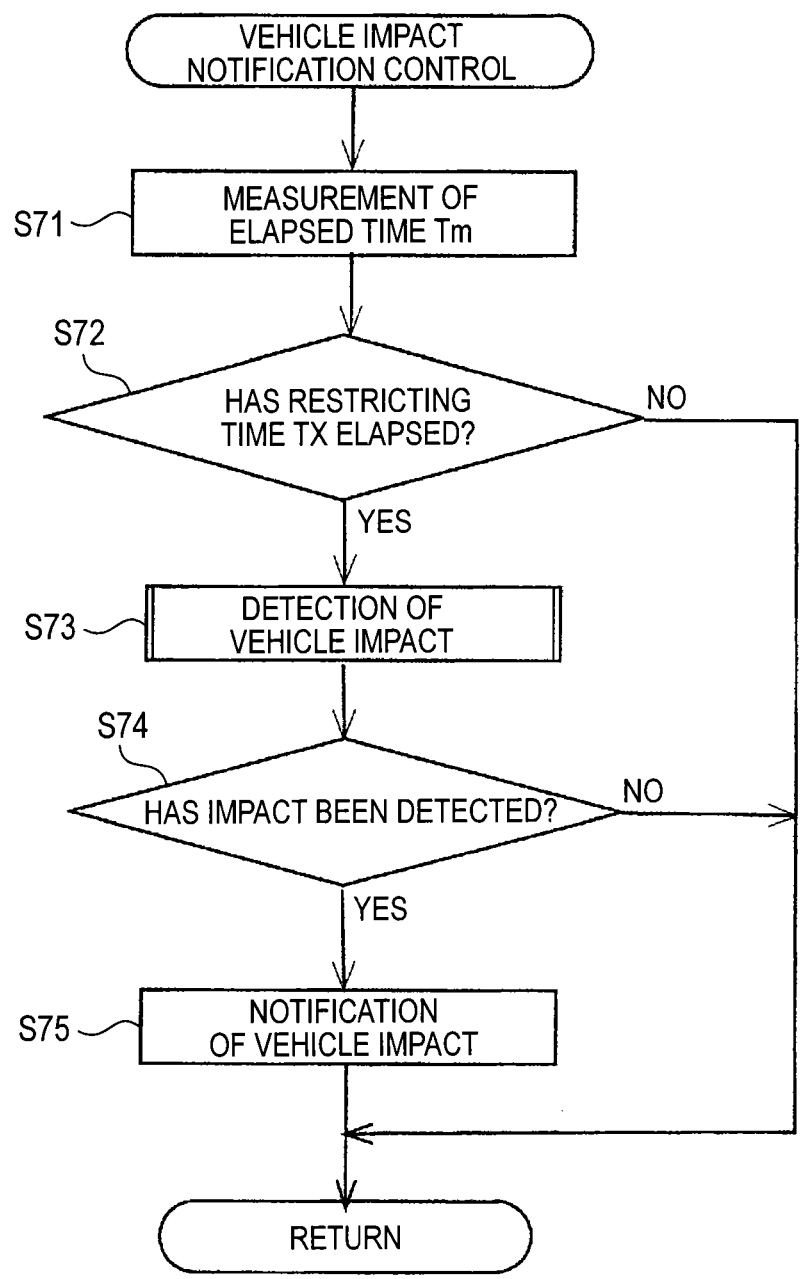
FIG. 8 is a flowchart diagram schematically illustrating another example of the vehicle impact notification control of the seat load detection apparatus.

Subsequently, on the basis of FIG. 8, another example of a vehicle collision notification control of the vehicle seat 1 by the controller 3 according to the embodiment disclosed here will be described. First of all, in Step S71, an elapsed time Tm from a time point when the seatback 12 has left the forwardly inclined position is measured. Subsequently, in Step S72, whether or not the elapsed time Tm exceeds the restricting time TX is determined. In Step 72, if the elapsed time Tm does not exceed the restricting time TX, the control flow is terminated without performing the vehicle impact detection.

In Step S72, if the elapsed time Tm exceeds the restricting time TX, the procedure goes to Step S73, where the vehicle impact detection is performed. Subsequently, whether or not there is the vehicle impact detection is determined in Step S74. If the fact that the impact is applied to the vehicle is not detected in Step S74, a control flow is terminated without performing the vehicle impact notification. In contrast, when the fact that an impact is applied to the vehicle is detected in Step S74, the procedure goes to Step S75, where the vehicle impact notification is performed and a vehicle impact notification unit 38 as the operating portion 33 is activated. The vehicle impact notification unit 33, as the in-vehicle speaker or the notification light-emitting member, notifies the fact that the inspection of the vehicle is needed because the impact is applied to the vehicle.

Therefore, when the seatback 12 is restored from the forwardly inclined position to the first stage position, an impact is generated when the seatback 12 is restored to the first stage position. Therefore, the same detected load W as the case where the vehicle seat 1 is changed to the state in which an impact is applied to the vehicle because the vehicle engages in the light collision at the rear of the vehicle when the vehicle moves rearward is obtained. In such a case, if the elapsed time Tm does not exceed the restricting time TX in the determination in Step S72, the vehicle impact detection is not performed, that is, execution of the determination itself of the state change of the vehicle seat 1 is restricted. Therefore, it is determined that the vehicle seat 1 is not changed to the state in which an impact is applied to the vehicle, and hence variation of the detected load W on the basis of the posture change of the seatback 12 is prevented from being erroneously recognized as the state change on the basis of other causes. More specifically, variation of the detected load W on the basis of the posture change which causes the seatback 12 to restore from the forwardly inclined position to the first stage position is prevented from being erroneously recognized as the state change of the vehicle seat 1 caused by the a light collision and an impact applied to the vehicle.

Figure 9:
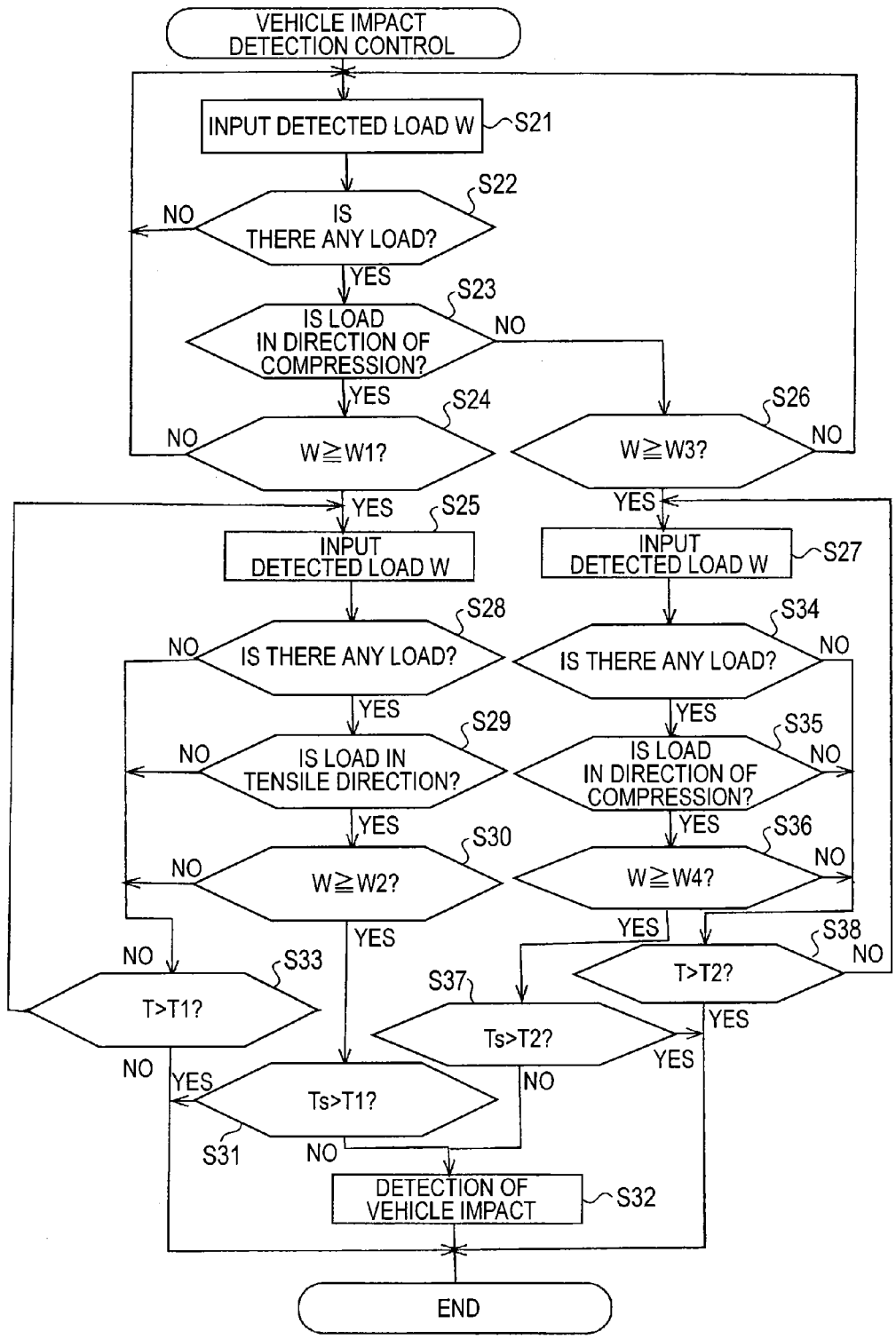
FIG. 9 is a flowchart diagram schematically illustrating an example of vehicle impact detection of the vehicle impact notification control.

Subsequently, the vehicle impact detection illustrated in FIG. 7 and FIG. 8 will be described with reference to FIG. 9. First of all, the detected load W of the load detector 31 is input in Step S21. Subsequently, in Step S22, whether or not a load is generated is determined on the basis of the detected load W. Specifically, whether or not the detected load W is larger than zero by a predetermined value $\delta$ ($\delta \approx 0$) is determined. When it is determined that the detected load W is smaller than $\delta$ and the load is not generated, the control flow is terminated.

When it is determined that the detected load W is not smaller than $\delta$ and the load is generated, whether the detected load W is the load in the direction of compression or the load in the tensile direction is determined (Step S23). When the detected load W is the load in the direction of compression, whether or not the detected load W is not smaller than the threshold value W1, which is a threshold value of the load in the direction of compression, is determined (Step S24). The threshold value W1 is a threshold value of the load in the direction of compression when an impact is applied to the vehicle, that is, it corresponds to a threshold value of the load in the direction of compression illustrated in the left drawing in FIG. 5 or in the left drawing in FIG. 6 described above.

When the detected load W is smaller than W1 which is the threshold value of the load in the direction of compression, the control flow is terminated. When the detected load W is not smaller than the threshold value W1, the procedure goes to Step S25. When the detected load W is the load in the tensile direction, whether or not the detected load W is not smaller than a threshold value W3 which is a threshold value of the load in the tensile direction, is determined (Step S26). The threshold value W3 is a threshold value of the load in the tensile direction when an impact is applied to the vehicle, that is, it corresponds to a threshold value of the load in the tensile direction illustrated in the left drawing in FIG. 5 or in the left drawing in FIG. 6 described above. When the detected load W is smaller than W3 which is the threshold value of the load in the tensile direction, the control flow is terminated. When the detected load W is not smaller than the threshold value W3, the procedure goes to Step S27.

In Step S25, the detected load W is input again, and subsequently, in Step S28, whether or not a load is generated is determined on the basis of the detected load W. When it is determined that the detected load W is not smaller than δ and the load is generated, whether the detected load W is the load in the direction of compression or the load in the tensile direction is determined (Step S29). When the detected load W is the load in the tensile direction, whether or not the detected load W is not smaller than the threshold value W2 as a threshold value of the load in the tensile direction is determined (Step S30). The threshold value W2 is a threshold value of the load in the tensile direction at the time of return after the application of an impact to the vehicle, that is, it corresponds to a threshold value of the load in the tensile direction illustrated in the right drawing in FIG. 5 or in the right drawing in FIG. 6 described above.

When the detected load W is not smaller than the threshold value W2, in Step S24, whether or not the time Ts elapsed from when it is determined the detected load W is not smaller than W1, which is a threshold value of load in the direction of compression until the value not smaller than the threshold value W2 is reached exceeds a threshold time T1 is determined (Step S31). When it is determined that the time Ts exceeds the threshold time T1, the control flow is terminated. When it is determined that the time Ts does not exceed the threshold time T1, the controller 3 detects, for example, the fact that the impact is applied to the vehicle by a collision (Step S32).

When the detected load W is smaller than δ and hence it is determined that the load is not generated in Step S28 described above, when the detected load W is determined to be the load in the direction of compression in Step S29, or when the detected load W is determined to be smaller than W2, which is the threshold value of the load in the tensile direction in Step S30, it is determined whether or not the time T elapsed from when it is determined that the detected load W is not smaller than W1 in Step S24, which is the threshold value of the load in the direction of compression exceeds the threshold time T1 (Step S33). When it is determined that the time T does not exceed the threshold time T1, the procedure goes back to Step S25, and when it is determined that the time T exceeds the threshold time T1, the control flow is terminated.

In contrast, in Step S27, the detected load W is input again, and subsequently, in Step S34, whether or not a load is generated is determined on the basis of the detected load W. When it is determined that the detected load W is not smaller than δ and the load is generated, whether the detected load W is the load in the direction of compression or the load in the tensile direction is determined (Step S35). When the detected load W is the load in the direction of compression, whether or not the detected load W is not smaller than the threshold value W4, which is a threshold value of the load in the direction of compression, is determined (Step S36). The threshold value W4 is a threshold value of the load in the direction of compression at the time of return after the application of an impact to the vehicle, that is, it corresponds to a threshold value of the load in the direction of compression illustrated in the right drawing in FIG. 5 or in the right drawing in FIG. 6 described above.

When the detected load W is not smaller than the threshold value W4, in Step S26, whether or not the time Ts elapsed from when the detected load W is not smaller than W3, which is a threshold value of load in the tensile direction, is determined until the value not smaller than the threshold value W4 is reached exceeds T2, which is a threshold time, is determined (Step S37). When it is determined that the time Ts exceeds the threshold time T2, the control flow is terminated. When it is determined that the time Ts does not exceed the threshold time T2, for example, the fact that the impact is applied to the vehicle by a collision is detected (Step S32).

In contrast, when the detected load W is smaller than δ and hence it is determined that the load is not generated in Step S34 described above, when the detected load W is determined to be the load in the tensile direction in Step S35, or when the detected load W is determined to be smaller than W4, which is the threshold value of the load in the direction of compression in Step S36, in Step S26, it is determined whether or not the time T elapsed from when it is determined that the detected load W is not smaller than W3, which is the threshold value of the load in the tensile direction exceeds the threshold time T2 (Step S38). When it is determined that the time T does not exceed the threshold time T2, the procedure goes back to Step S27, and when it is determined that the time T exceeds T2, the control flow is terminated.

Figure 10:
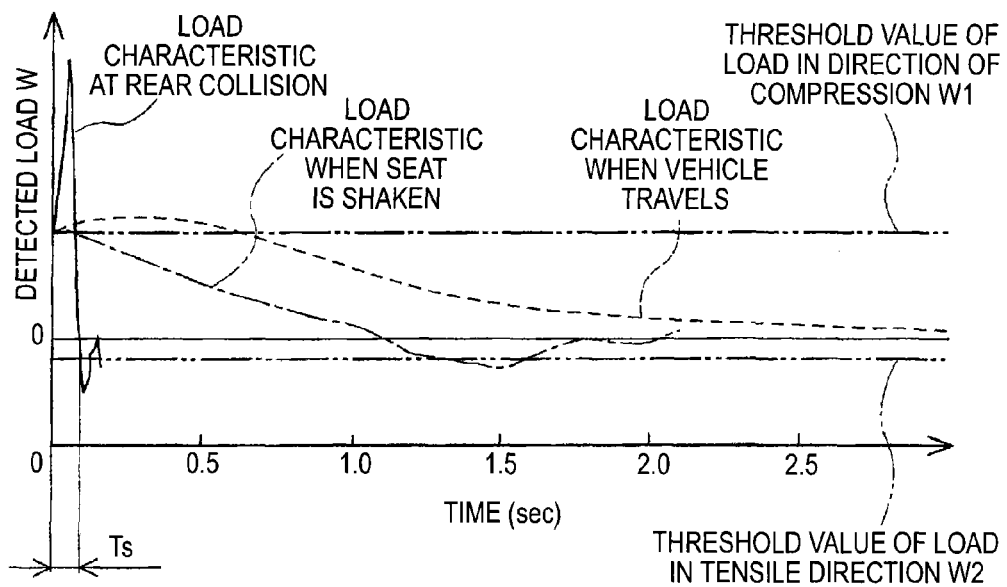
FIG. 10 is a drawing illustrating a graph in which load characteristics obtained by the seating sensor at the time of the rear collision of the vehicle is compared with the load characteristics obtained at the time of an occurrence of other phenomena.
Figure 11:
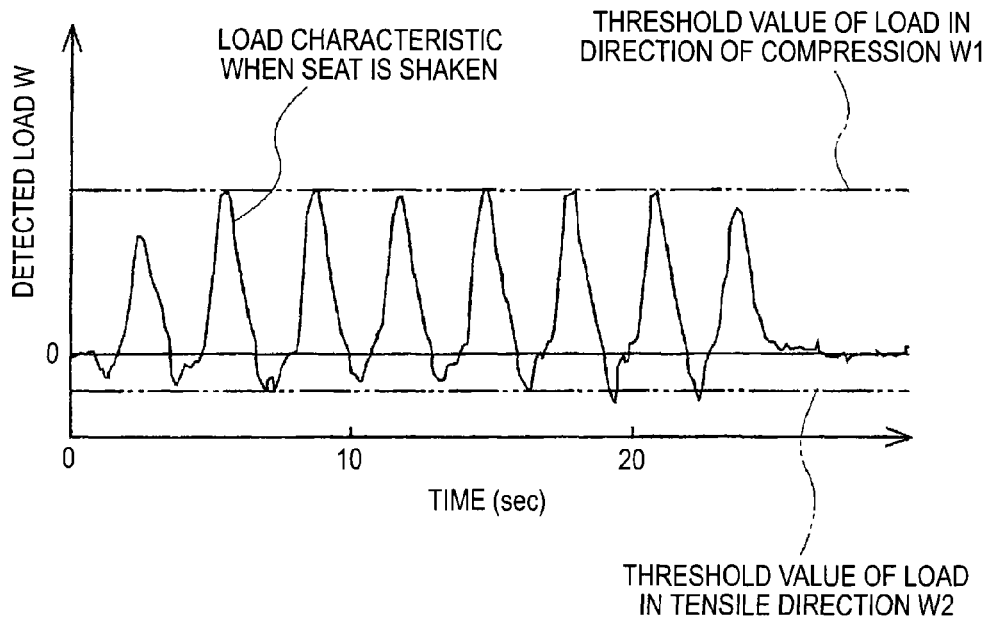
FIG. 11 is a drawing illustrating load characteristics obtained by the seating sensor when the vehicle seat is shaken.
Figure 12:
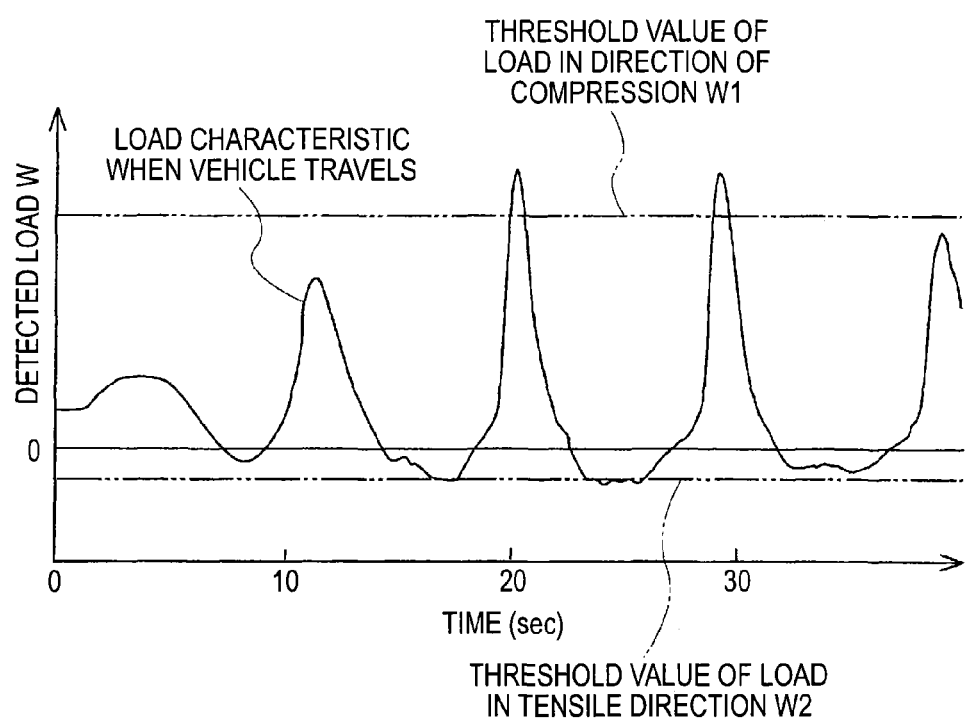
FIG. 12 is a drawing illustrating load characteristics obtained by the seating sensor during the travel of the vehicle.

Subsequently, on the basis of FIG. 10 to FIG. 12, a load characteristic of the detected load W detected by the load detector 31 when an impact is applied to the vehicle by a collision will be described in comparison with load characteristic in other phenomena. In FIG. 10 to FIG. 12, plus areas of vertical axes indicate a case where the detected load W is a load in the direction of compression, and minus areas thereof indicate a case where the detected load W is a load in the tensile direction. The value of the load in the tensile direction is indicated to be increased as it goes in the minus direction.

Furthermore, a diagram indicated by a chain line in FIG. 10 indicates the detected load W in a case where the passenger shakes the vehicle seat 1 by his or her hand intentionally. It is the same as the diagram illustrated in FIG. 11. However, the temporal length of the lateral axis in FIG. 11 is enlarged to ten times that illustrated in FIG. 10.

A diagram indicated by a broken line in FIG. 10 indicates the detected load W in a case where the vehicle travels on a road having a wavy surface (wavy load). It is the same as the diagram illustrated in FIG. 12. However, the temporal length of the lateral axis in FIG. 12 is enlarged to ten times that illustrated in FIG. 10.

As illustrated by a solid line in FIG. 10, when the rear collision of the vehicle occurs and when the seatback 12 is restored from the forwardly inclined position to the first stage position, for example, the load detector 31 detects the load in the direction of compression exceeding the threshold value W1 and then detects the load in the tensile direction exceeding the threshold value W2 in a short time Ts. As understood from the drawing, the time Ts from a moment when the load in the direction of compression exceeds the threshold value W1, until the load in the tensile direction exceeds the threshold value W2 is a time as short as time shorter than 0.2 sec.

In contrast, the temporal interval between the load in the direction of compression and the load in the tensile direction of the detected loads W obtained when the seat is shaken and when the vehicle travels is approximately 10 times of the detected load W obtained when the vehicle collides, and the load in the direction of compression and the load in the tensile direction rarely exceed the respective threshold values W1 and W2.

Therefore, as regards the threshold values W1 and W4 of the load in the direction of compression and the threshold values W2 and W3 of the loads in the tensile direction described above, the loads applied to the seat cushion 11 when an impact is applied to the vehicle by a collision are set in advance to be values which can be distinguished from the load generated in the seat cushion 11 by other phenomena. The threshold value W1 for the load in the direction of compression and the threshold value W3 for the load in the tensile direction correspond to the load of a first set value set in advance as described in Claims and, in contrast, the threshold value W2 for the load in the tensile direction and the threshold value W4 for the load in the direction of compression correspond to the load of a second set value set to be a lower value than the first set values W1 and W3 as described in Claims. In addition, as regards the threshold times T1 and T2, it is understood that the fact that an impact is applied to the vehicle may be determined on the basis of the detected load W obtained by the load detector 31 by setting the temporal interval between the load in the direction of compression and the load in the tensile direction generating continuously in the seat cushion 11 to be a time which can be distinguished from the temporal interval between the load in the direction of compression and the load in the tensile direction generated in the seat cushion 11 by other phenomena when an impact is applied to the vehicle due to the collision. The threshold time T1 and the threshold time T2 correspond to the first set time set in advance as described in Claims, and the restricting time TX is set to be longer than the first set times T1 and T2.

According to the embodiment, the fact that an impact is easily applied to the vehicle may be determined only by detecting the load generated in the seat cushion 11 by using the exiting seating sensors 2R and 2L by determining that an impact is applied to the vehicle when the load in the tensile direction not smaller than W2 is detected within the threshold time T1 after the detection of the load in the direction of compression not smaller than W1 in the peripheral edge portion of the seat cushion 11, or when the load in the direction of compression not smaller than W4 is detected within the threshold time T2 after the detection of the load in the tensile direction not smaller than W3 in the peripheral edge portion of the seat cushion 11 by the seating sensors 2R and 2L.

The seating sensors 2R and 2L may determine easily that an impact is applied to the vehicle due to the front collision or the rear collision by being mounted on a rear edge portion of the seat cushion 11. Furthermore, the load of the seated person or the like can easily be applied to the seating sensors 2R and 2L by the seating sensors 2R and 2L mounted on the rear edge portion of the seat cushion 11. Therefore, even though the seating sensors 2R and 2L are not provided on the front portion of the seat cushion 11, the change of the load to be applied to the seat cushion 11 may be detected easily, so that an accurate determination of the presence or absence of the impact on the vehicle and cost reduction of the vehicle seat 1 associated with the reduction of the number of the seating sensors 2R and 2L may be achieved simultaneously.

At least one each of the seating sensors 2R and 2L are mounted on the left and right portions of the seat cushion 11, and the load detector 31 obtains the detected load W by using the sum of outputs for the seating sensors 2R and 2L. Therefore, by determining that an impact is applied to the vehicle when the load not smaller than W2 in the tensile direction is detected within the threshold time T1 after the detection of the load in the direction of compression not smaller than W1 by at least one of the seating sensors 2R and 2L, or when the load in the direction of compression not lower then W4 is detected within the threshold time T2 after the detection of the load in the tensile direction not smaller than W3, even when the load generated on the left and right potions of the seat cushion 11 is leaning on one side, the presence or absence of the impact on the vehicle can be determined accurately without missing the change of the load.

Subsequently, the actions, the computations, and the contents of processing of the hill determination unit 35, the load correcting unit 37, and the load body determination unit 34 of the seat load detection apparatus 10 will be described. Subsequent to the zero-point calibration of the detected load W, the detected load with no load and angle of fore-and-aft inclination correspondence unit 52 indicating the relation between the detected load W with no load output from the load detector 31 when the load body is not placed on the vehicle seat 1 and a fore-and-aft inclination angle A1 of the vehicle is obtained in advance. The detected load with no load and angle of fore-and-aft inclination correspondence unit 52 is obtained by causing the vehicle to be inclined to the front and rear in a vacant state in which no load body is placed on the vehicle seat 1 and obtaining the detected load W. In other words, the detected load with no load and angle of fore-and-aft inclination correspondence unit 52 is established by storing the relation at this time between the detected load W and the fore-and-aft inclination angle A1 in a memory unit in a form of, for example, a correspondence map or a function expression. In the embodiment, the lower the front of the vehicle inclines, the more the rate of the share of the own weight of the vehicle seat 1 leans forward, and hence the detected load W with no load obtained by the load detector 31 using the seating sensors 2R and 2L arranged on the rear side is reduced toward the negative side. In contrast, the higher the front of the vehicle is inclined, the more the rate of the share of the own weight of the vehicle seat 1 leans rearward, and hence the detected load W with no load is increased toward the positive side.

Figure 13:
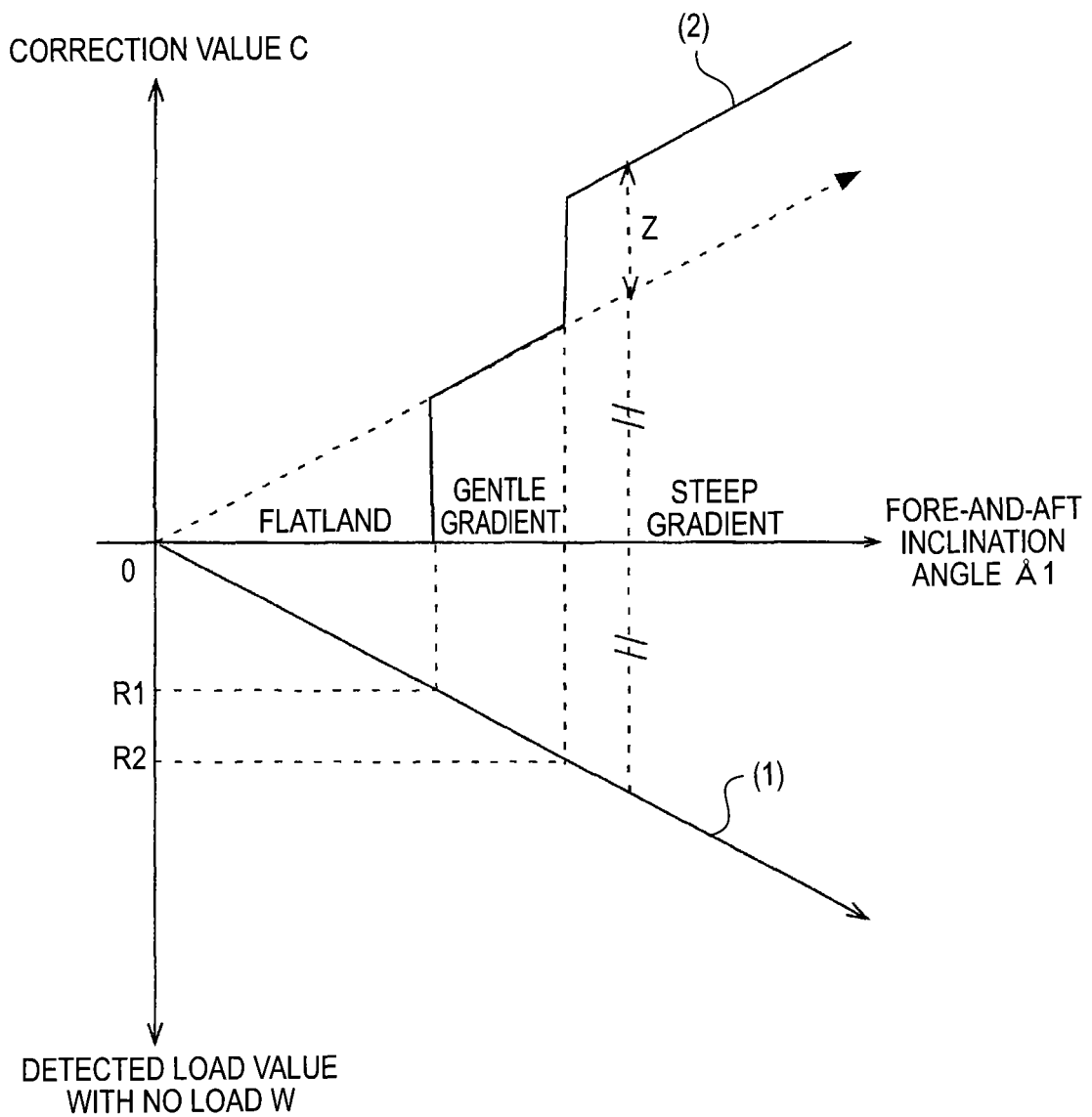
FIG. 13 is a graph illustrating an example of a detected load with no load and angle of fore-and-aft inclination correspondence unit and a correction value in the configuration illustrated in FIG. 4.

FIG. 13 is a graph illustrating the detected load with no load and angle of fore-and-aft inclination correspondence unit 52 and an example of a correction value C in the configuration in FIG. 4. The lateral axis in the drawing indicates the fore-and-aft inclination angle A1 in which the front of the vehicle is inclined downward on the downhill, the negative side of the vertical axis indicates a graph (1) of the detected load W with no load and the positive side of the vertical axis indicates a graph (2) of the correction value C. The point of origin 0 of the graph (1) of the detected load W with no load indicates that the detected load W with no load is calibrated to "0" (N or kgw) when the fore-and-aft inclination angle A1=0 (°) in the zero point calibration described above. In the example in FIG. 13, the detected load W with no load and the fore-and-aft inclination angle A1 are proportional.

Furthermore, a vacant seat determination value W0 at a higher level than a variation area of the detected load W with no load is set in advance. The reason why the vacant seat determination value W0 is not set to zero is that the probability of losing determination of the vacant seat needs to be avoided because the vehicle stops on the uphill and hence the detected load W with no load becomes a positive value in the vacant state.

The vacant seat determination unit 51 determines the vacant state of the vehicle seat 1 by receiving the detected load W output from the load detector 31 as an input. The determination logic determines that the seat is vacant when the detected load W is smaller than the vacant seat determination value W0.

When the vacant seat determination unit 51 determines that the seat is vacant, the fore-and-aft inclination angle arithmetic unit 53 computes the fore-and-aft inclination angle A1 of the vehicle corresponding to the detected load W output from the load detector 31 on the basis of the detected load with no load and angle of fore-and-aft inclination correspondence unit 52. The fore-and-aft inclination angle A1 corresponds to the inclination angle of the hill as described in Claims. The term "computation" here is, for example, to search the correspondence map and obtain the fore-and-aft inclination angle A1 corresponding to the detected load W, or to calculate the fore-and-aft inclination angle A1 by substitution of the detected load W in the function expression. Furthermore, in the embodiment disclosed here, the fore-and-aft inclination angle arithmetic unit 53 expresses the fore-and-aft inclination angle A1 of the vehicle by replacing with the gradient of the road surface and divides the same into three stages by using a gentle gradient determination value R1 and a steep gradient determination value R2 as illustrated in FIG. 13. In other words, the fore-and-aft inclination angle A1 is divided into any one of the state of inclination as follows. If the detected load W includes zero from a positive value and exceeds the downward gentle gradient determination value R1, it is determined as a "flatland", if the detected load W is not higher than the downward gentle gradient determination value R1 and exceeds the steep gradient determination value R2, it is classified as "gentle gradient", and if the detected load W is not higher than the steep gradient determination value R2, it is determined as "steep gradient".

When the seatback 12 is at the forwardly inclined position, since the center of gravity of the seatback 12 is displaced forward, the detected load W with no load becomes a value on the negative side in the same manner as the case of the downhill even when the road is flat. The characteristic of the detected load W as described above is based on the embodiment disclosed here having a configuration in which the seating sensors 2R and 2L are mounted on the rear edge portion of the seat cushion 11 of the vehicle seat 1, and the strain gauge is adhered to the lower surface of the flexure element 23. Assuming that the configuration is changed to a configuration in which the strain gauge is adhered to the upper surface of the flexure element 23, when the seatback 12 is at the forwardly inclined position, since the center of gravity of the seatback 12 is displaced forward, it is apparent that the detected load W with no load and the value of the positive side are inverted in the same manner as the case of the uphill even though the road is flat.

The detected load with no load and angle of fore-and-aft inclination correspondence unit 52, the vacant seat determination unit, and the fore-and-aft inclination angle arithmetic unit 53 constitute the hill determination unit 35. Therefore, the hardware such as the inclination sensor configured to detect the fore-and-aft inclination angle of the vehicle is not provided separately.

The load correcting unit 37 corrects the detected load W output from the load detector 31 when the load body is placed on the vehicle seat 1 according to the fore-and-aft inclination angle A1. The load correcting unit 37 obtains the correction value C to be added to the detected load W in advance and stores the same therein. The correction value C is determined on the basis of an additional result of experiment which is a relationship between the detected load W and the fore-and-aft inclination angle A1 by allowing a plurality of adult test subjects to be seated in sequence on the vehicle seat 1 and inclining the vehicle so that the front side is lowered. Specifically, as illustrated in the graph (2) in FIG. 13, the correction value C is zero on the "flatland", a negative value of the detected load W with no load with an inverted sign on the "gentle gradient", and a negative value of the detected load W with no load with an inverted sign and added with a constant load value Z on the "steep gradient". Then, when operating actually, the correction is not performed on the "flatland", and the detected load W output from the load detector 31 is added with the correction value C to obtain a correction load value WC on the "gentle gradient" and "steep gradient".

The load body determination unit 34 compares the magnitude of the detected load W or the correction load value WC with those of the predetermined adult determination value WX and a standard adult male determination value WY and determines the load body such as a passenger seated on the vehicle seat 1. The adult determination value WX is set on the basis of the weight of an undersized adult female, for example, 5 percentile value, and the standard adult male determination value WY is set on the basis of the weight of a standard adult male, for example, 50 percentile value. The load body determination unit 34 refers to the buckle information BSW, and performs the determination of continuation of the predetermined time by using a timer, and details of the function will be described with reference to the next load body determination control flow.

Figure 14:
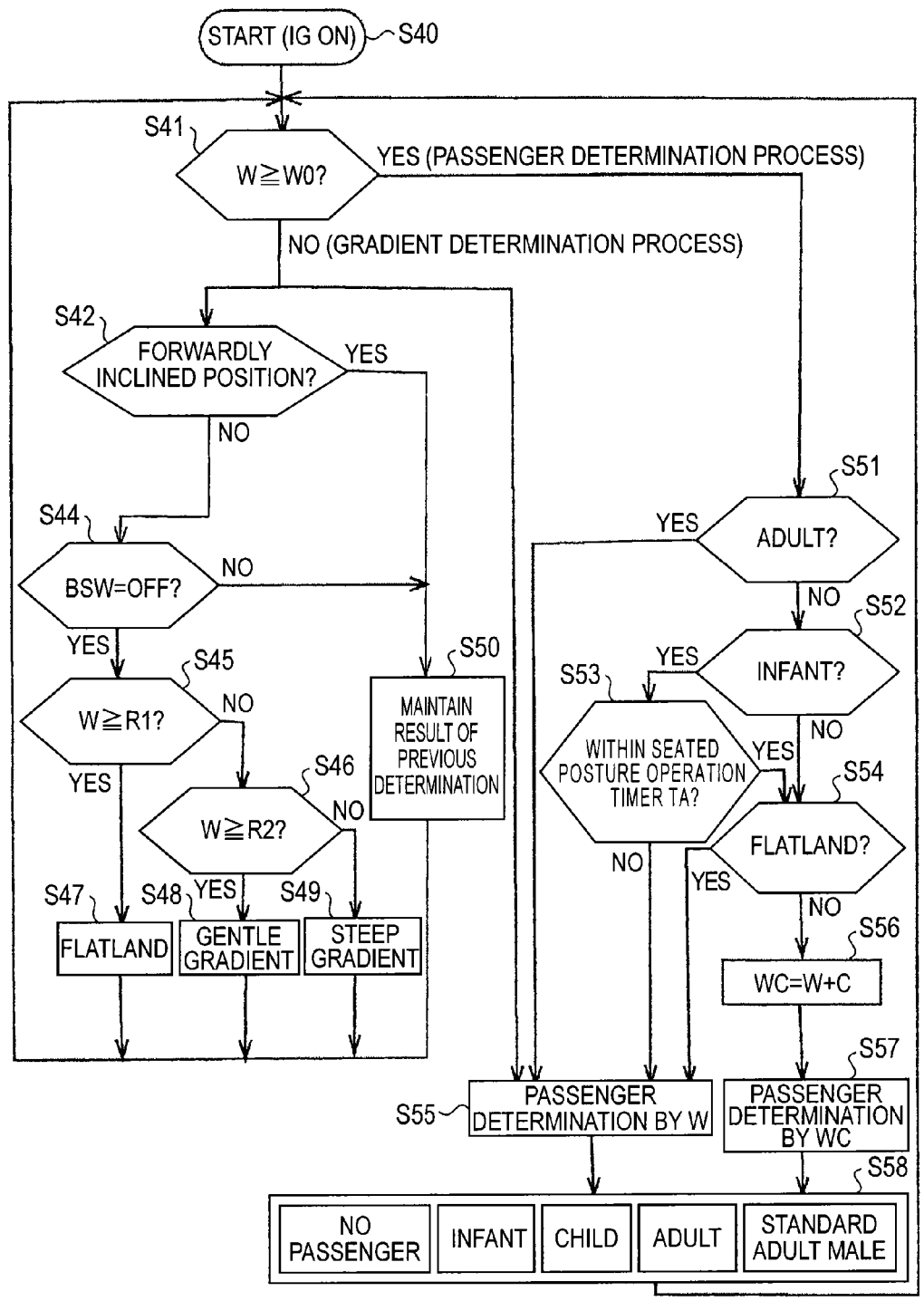
FIG. 14 is a flowchart diagram schematically illustrating an example of load body determination control of the seat load detection apparatus.

The load body determination control flow is as illustrated in FIG. 14, and when starting the vehicle, the state of inclination of the road surface is determined if possible, and then the passenger on the vehicle seat 1 of the passenger seat is determined as the load body. First of all, when an ignition switch IG is turned ON in Step S40, the operation of the load body determination control flow in the controller 3 is started. Subsequently, in Step S41, the vacant seat determination unit 51 determines that the seat is vacant when the detected load W is smaller than the vacant seat determination value W0, and moves to a gradient determination process in Steps S42 to S50 and a passenger determination process without correction in Step S55. Also, the vacant seat determination unit 51 determines that a passenger is seated when the state in which the detected load W is not smaller than the vacant seat determination value W0 continues for a predetermined time, and moves to a passenger determination process in Steps S51 to S58.

Subsequent to the determination of the vacancy of seat, the fore-and-aft inclination angle arithmetic unit 53 performs a gradient determination process in Steps S42 to S50. In Step S42, the fore-and-aft inclination angle arithmetic unit 53 determines whether or not the seatback 12 is at the forwardly inclined position on the basis of a signal from the seat posture detector 71. When the seatback 12 is at the forwardly inclined position as illustrated in FIG. 2, it is determined that the gradient determination is not performed during a time TY when the seatback 12 is in the forwardly inclined position in Step S42, that is, the hill determination unit 33 is restricted from determining whether or not the vehicle is on the hill and from determining whether or not the vehicle seat 1 has changed to the state in which the correction of the detected load W in accordance with the inclination angle of the hill is needed, and the result of gradient determination of the previous time is maintained in Step S50. Therefore, although the detected load W becomes the same as that in a state in which the vehicle is on the hill associated with the posture change of the seatback to the forwardly inclined position, in such a state, it can be determined that the state of the vehicle seat 1 is not changed to a state in which the correction of the detected load W in accordance with the inclination angle of the hill is needed in Step 42, so that the variation of the detected load W on the basis of the posture change of the seatback 12 is prevented from being erroneously recognized as the state change of the vehicle seat 1 caused by an application of an impact to the vehicle due to a light collision of the vehicle. More specifically, the variation of the detected load W associated with the posture change of the seatback 12 to the forwardly inclined position is prevented from being erroneously recognized as the state change of the vehicle seat 1 in which the correction of the detected load W is needed in association with the fore-and-aft inclination angle A1 of the hill. The time TY in which the seatback 12 is at the forwardly inclined position corresponds to a restricting time as described in Claims.

In Step S42, when the seatback 12 is not at the forwardly inclined position, whether or not the vehicle is on the hill is determined and also it is determined that the vehicle seat 1 has changed to a state in which the correction of the detected load W is needed according to the inclination angle of the hill, and then the procedure goes to Step S44. In Step S44, the fore-and-aft inclination angle arithmetic unit 53 confirms the buckle information BSW. If it is in the OFF state, the magnitude of detected load W is compared with those of the gentle gradient determination value R1 and the steep gradient determination value R2 in Steps S45 and S46. Then, on the basis of the result of the comparison, the gradient of the road surface is determined to be one of the states of inclination including the "flatland" in Step S47, the "gentle gradient" in Step S48, and the "steep gradient" in Step S49. By newly obtaining one of the states of inclination, the result of the gradient determination of the previous time is renewed. If the buckle information BSW is in the ON state in Step S44, it is determined that any load body remains on the vehicle seat 1 and the gradient determination cannot be performed, and the result of gradient determination of the previous time is maintained in Step S50. The procedure then goes back to Step S41.

In the Steps described thus far, if the vehicle seat 1 is actually vacant, it is determined to be the vacant state in Step S41, the gradient is determined in Steps S42 to S50, and the state is determined to be "no passenger" in the passenger determination process without correction in Step S55 as described later. In contrast, if a passenger is actually seated on the vehicle seat 1, the detected load W normally becomes a value not smaller than the vacant seat determination value W0 and the procedure goes to the passenger determination process from Step S51 onward. Even when the passenger is seated on the vehicle seat 1, when a high detected load W due to the posture change such as reseating is not exceptionally detected, it is determined to be the vacant state. At this time, fastening of the seatbelt is confirmed and determination of the gradient is not performed in Step S44, and the result of determination of the previous time is maintained in Step S50. Furthermore, in the passenger determination process without correction in Step S55, the determination of the passenger is performed by using a stable detected load W after the posture change.

In the passenger determination process following the determination of passenger present, the load correcting unit 37 performs the processes of Steps S51 to S54 and S56, and the load body determination unit 34 performs the processes of Steps S55, S57, and S58. In Step S51, the load correcting unit 37 determines that the passenger is an adult when the state in which the detected load W is not smaller than the adult determination value WX continues for a predetermined time, and the procedure goes to Step S55 and if not, goes to Step S52. When the detected load W is not smaller than the vacant seat determination value W0 and smaller than the adult determination value WX, and the buckle information BSW is in the ON state in Step S52, the passenger is determined to be an infant, and the procedure goes to Step S53 and, if not, goes to Step S54. When the determination of the infant has continued for a time of a seated posture operated timer TA continuously in Step S53, the procedure goes to Step S55, and if not, the procedure goes to Step S54. In Step S54, if the gradient of the road surface obtained by the gradient determination process in Steps S42 to S50 is "flatland", the correction is not performed and the procedure goes to Step S55, if the gradient is "gentle gradient" or "steep gradient", the correction value C is added to the detected load W to obtain the correction load value WC in Step S56, and then the procedure goes to Step S57.

In the passenger determination process without correction in Step S55, the load body determination unit 34 uses the detected load W to settle the determination of the passenger, and in a passenger determination process with correction in Step S57, the load body determination unit 34 settles the determination of passenger using the correction load value WC. The determination in Step S58 will be described in detail. When the detected load W or the correction load value WC is smaller than the vacant seat determination value W0, it is determined to be "no passenger". When the detected load W or the correction load value WC is not smaller than the vacant seat determination value W0 and smaller than the adult determination value WX, if the buckle information BSW is in the ON state, the passenger is determined to be an "infant", and when the buckle information BSW is in the OFF state, it is determined to be a "child". In addition, when the detected load W or the correction load value WC is not smaller than the adult determination value WX and smaller than the standard adult male determination value WY, the passenger is determined to be an "adult" and when it is not smaller than the standard adult male determination value WY, the passenger is determined to be a "standard adult male". The determination as described above is settled when a predetermined time has elapsed in a state in which the detected load W or the correction load value WC falls within the range thereof.

When the result of determination is added, the term "infant" means an infant seated on a child seat fixed by the seatbelt and the term "child" means a child having a weight smaller than the adult and not fastening the seatbelt. The term "adult" means an adult having a weight not smaller than an undersized adult female and not larger than a standard adult male, and the term "standard adult male" means an adult having a weight not smaller than the standard adult male.

The reason why the seated posture operated timer TA is used in Step S53 is that the determination is not settled even though the small detected load W is detected by the influence of the transient seated position or the seated posture when an adult is seated on the vehicle seat 1, so that a final determination is performed when the passenger is seated stably and a large detected load W is detected.

After the result of determination is settled, even though the detected load W is instantaneously changed, it is determined to be caused by the influence of the posture change of the passenger and the vibration caused by the traveling of the vehicle and the result of determination is not changed. Even after the settlement of the result of determination, when a continuous change of the detected load W or a state change of the buckle information BSW occurs, there is a probability that the load body is replaced by getting on and off of the passenger, and hence the procedure goes back from Step S58 to Step S41, and the determination is performed again.

By controlling whether or not the airbag is to be deployed in case of an accident or the deployment speed on the basis of the result of passenger determination in Step S58 described above, conformation to North America Law is achieved. North America Law prescribes that the airbag is deployed in case of an accident if the passenger is an "adult", and the deployment of the airbag is prohibited in case of an accident if the passenger is an "infant". However, there is no prescription about a "child" having an intermediate weight. Furthermore, as regards the "adult", the deployment speed of the airbag is prescribed to be high for the adult having a weight not smaller than the "standard adult male", and the deployment speed of the airbag for other cases is set to be low.

As described above, according to the seat load detection apparatus 10 of the embodiment disclosed here, the load detector 31 configured to detect part of a load acting on the vehicle seat 1 which is capable of changing the posture of the seatback 12 forward from the initial stage position as the most upright position of the seatable position to the forwardly inclined position which is a position on which the passenger cannot be seated; the load body determination unit 34 configured to determine a load body acting on the vehicle seat 1 on the basis of the detected load W detected by the load detector 31; the seat posture detector 71 configured to detect the forwardly inclined position of the seatback 12; and the state determination unit 32 configured to determine the state change of the vehicle seat 1 on the basis of the variation of the detected load W and restrict the determination of the state change of the vehicle seat 1 on the basis of an output from the seat posture detector 71 are provided. Therefore, erroneous recognition of the variation of the detected load W on the basis of the posture change of the seatback 12 as the state change on the basis of other causes may be suppressed.

As described above, according to the seat load detection apparatus 10 of the embodiment disclosed here, the state determination unit 32 is configured to restrict the determination of the state change of the vehicle seat 1 until the preset restricting times TX and TY have elapsed when there is a change in detected state of the seatback 12 by the seat posture detector 71. Therefore, erroneous recognition of the variation in the detected load W on the basis of the posture change of the seatback 12 as the state change on the basis of other causes may further be suppressed.

As described above, according to the seat load detection apparatus 10 of the embodiment disclosed here, the state determination unit 32 has a configuration to determine whether or not the vehicle seat 1 has changed into a state in which an impact is applied to the vehicle on the basis of the variation in the detected load W. Therefore, for example, when the seatback 12 is restored from the forwardly inclined position to the first stage position, an impact is generated when the seatback 12 is restored to the first stage position. Therefore, the same detected load W as the case where the vehicle seat 1 is changed to the state in which an impact is applied to the vehicle because the vehicle engages in the light collision at the rear of the vehicle when the vehicle moves rearward is obtained. In such a case, it is determined that the vehicle seat 1 is not changed to the state in which an impact is applied to the vehicle, and variation of the detected load W on the basis of the posture change of the seatback 12 is prevented from being erroneously recognized as the state change of the vehicle seat 1 caused by an impact applied to the vehicle due to a light collision of the vehicle.

As described above, according to the seat load detection apparatus 10 of the embodiment disclosed here, when the detected load W is a load not smaller than the first set values W1 and W2 set in advance and then makes a transition to a value not higher than the second set values W2 and W4 set to be smaller than the first set values W1 and W2 within the first set times T1 and T2 set in advance, the state determination unit 32 is determined that the vehicle seat 1 is changed to a state in which an impact is applied to the vehicle, and the restricting time TX is set to be longer than the first set times T1 and T2. Therefore, for example, when the seatback 12 is restored from the forwardly inclined position to the first stage position, an impact is generated when the seatback 12 is restored to the first stage position. Therefore, the same detected load W as the case where the vehicle seat 1 is changed to the state in which an impact is applied to the vehicle because the vehicle engages in the light collision at the rear of the vehicle when the vehicle moves rearward is obtained. In such a case, it is determined that the vehicle seat 1 is not changed to the state in which an impact is applied to the vehicle, and variation of the detected load W on the basis of the posture change of the seatback 12 is prevented from being erroneously recognized as the state change of the vehicle seat 1 caused by an impact applied to the vehicle due to a light collision of the vehicle.

As described above, according to the seat load detection apparatus 10 of the embodiment disclosed here, the state determination unit 32 determines whether or not the vehicle is on the hill on the basis of the variation of the detected load W, and whether or not the vehicle seat 1 is changed to the state in which the correction of the detected load W is needed in accordance with the fore-and-aft inclination angle A1 of the hill. Therefore, although the same detected load W as the case where the vehicle is on the hill is obtained in association with the posture change of the seatback to the forwardly inclined position, in such a state, it is determined that the vehicle seat 1 is not changed to a state in which the correction of the detected load W is needed in accordance with the inclination angle A1 of the hill, so that the variation of the detected load W on the basis of the posture change of the seatback 12 is prevented from being erroneously recognized as the state change in which the correction of the detected load W is needed for the vehicle seat 1 according to the inclination angle A1 of the hill.

As described above, according to the seat load detection apparatus 10 of the embodiment disclosed here, the state determination unit 32 is configured to restrict the determination of the state change of the vehicle seat 1 for the time TY when the forwardly inclined position of the seatback 12 is detected by the seat posture detector 71. Therefore, erroneous recognition of the variation in the detected load on the basis of the posture change of the seatback 12, the variation in the detected load on the basis of the posture change of the seatback 12, as the state change in which the correction of the detected load W of the vehicle seat 1 is needed in accordance with the inclination angle A1 of the hill may further be suppressed.

In the embodiment disclosed here, the fact that the same detected load as the case where the vehicle engages in a light collision is obtained when the posture of the seatback 12 is changed from the first stage position to the forwardly inclined position as an example of the posture change of the seatback 12 has been described. In contrast, since the same detected load as the case where the vehicle engages in a light collision is detected also when the posture of the seatback 12 is changed from the seated position to the forwardly inclined position, it is apparent that the determination of the state change of the vehicle seat 1 may be restricted also when the posture is changed from the seated position to the forwardly inclined position of the seatback 12.

The characteristic of the detected load W is based on a configuration in which the embodiment disclosed here, that is, the seating sensors 2R and 2L are mounted on the rear edge portion of the seat cushion 11 of the vehicle seat 1, and the strain gauge is adhered to the lower surface of the flexure element 23. Assuming that the configuration is changed to a configuration in which the strain gauge is adhered to the upper surface of the flexure element 23, the load in the direction of compression and the load in the tensile direction, that is, the positive direction and the negative direction of the detected load W are inverted from those in the embodiment disclosed here, and hence it is apparent that the configuration is changed so as to correspond to the reverse configuration.

Although the invention has been described with reference to the embodiment, the invention is not limited to the configuration described in the embodiment, and various modes may be taken within a range described in Claims. It is apparent that characteristic portions of the respective embodiments may be combined as needed in a case where a plurality of embodiments exist unless otherwise specifically described.

The invention claimed is:

1. A seat load detection apparatus comprising:
   a load detector configured to detect part of a load acting on a vehicle seat which is capable of changing the posture of a seatback from a first stage position as a most upright position of a seatable position to a forwardly inclined position which is a forwardly inclined position on which the passenger cannot be seated;
   a load body determination unit configured to determine a load body acting on the vehicle seat on the basis of a detected load detected by the load detector;
   a seat posture detector configured to detect only the forwardly inclined position of the seatback; and
   a state determination unit configured to determine the state change of the vehicle seat on the basis of the variation of the detected load and, the state determination unit is configured to restrict the determination of the state change of the vehicle seat on the basis of an output from the seat posture detector, when the seatback is restored from the forwardly inclined position to the first stage position.

2. The seat load detection apparatus according to claim 1, wherein the state determination unit is configured to restrict the determination of the state change of the vehicle seat until a preset restricting time has elapsed when there is a change in detected state of the seatback by the seat posture detector.

3. The seat load detection apparatus according to claim 1, wherein the state determination unit determines whether or not the vehicle seat has changed to a state in which an impact is applied to the vehicle on the basis of the variation of the detected load.

4. The seat load detection apparatus according to claim 2, wherein the state determination unit determines whether or not the vehicle seat has changed to a state in which an impact is applied to the vehicle on the basis of the variation of the detected load.

5. The seat load detection apparatus according to claim 3, wherein when the detected load is a load not smaller than a first set value set in advance and then makes a transition to a value not higher than a second set value set to be smaller than the first set value within a first set time set in advance, the state determination unit determines that the vehicle seat is changed to the state in which an impact is applied to the vehicle, and the restricting time is set to be longer than the first set time.

6. The seat load detection apparatus according to claim 1, wherein the state determination unit determines whether or not the vehicle is on the hill on the basis of the variation of the detected load, and whether or not the vehicle seat is changed to a state in which the correction of the detected load is needed in accordance with the inclination angle of the hill.

7. The seat load detection apparatus according to claim 6, wherein the state determination unit restricts the determination of the state change of the vehicle seat for a period when the forwardly inclined position of the seatback is detected by the seat posture detector.

* * * * *